United States Patent [19]

Jöhri

[11] Patent Number: 5,030,489
[45] Date of Patent: Jul. 9, 1991

[54] PLASTIC MOLDING FOR PIPE SYSTEMS

[75] Inventor: Heimo Jöhri, Jona, Switzerland

[73] Assignee: Geberit AG, Jona, Switzerland

[21] Appl. No.: 400,209

[22] Filed: Aug. 29, 1989

[30] Foreign Application Priority Data

Aug. 29, 1988 [CH] Switzerland ............... 3196/88

[51] Int. Cl.⁵ .............................................. B32B 3/00
[52] U.S. Cl. .............................. 428/36.4; 428/36.91;
428/192; 138/140; 138/141; 138/145; 138/153
[58] Field of Search ............... 138/140, 141, 145, 153;
428/36.4, 36.91, 192

[56] References Cited

U.S. PATENT DOCUMENTS 4,840,826  6/1989  Shirasaki et al. ............... 428/36.91

FOREIGN PATENT DOCUMENTS 0123652  7/1984  Japan .
0162519  7/1987  Japan .
0634137  1/1983  Switzerland .

Primary Examiner—Patrick J. Ryan
Attorney, Agent, or Firm—Pollock, Vande Sande & Priddy

[57] ABSTRACT

The molding has a body (3) of thermoplastic. A sound-muffling layer (4), which is affixed to the body (3) by the injection-molding process, consists of a thermoplastic elastomer. The body (3) protrudes at its end from the sound-muffling layer (4). Welding sleeves (2) are welded onto these unlayered areas (5) of the body (3). Molding (1) in the course of repair work can also be severed in the area of the sound-muffling layer (4) and joined by means of butt welding. The thickness of the sound-muffling layer (4) is comparatively small.

5 Claims, 1 Drawing Sheet

U.S. Patent
July 9, 1991
5,030,489
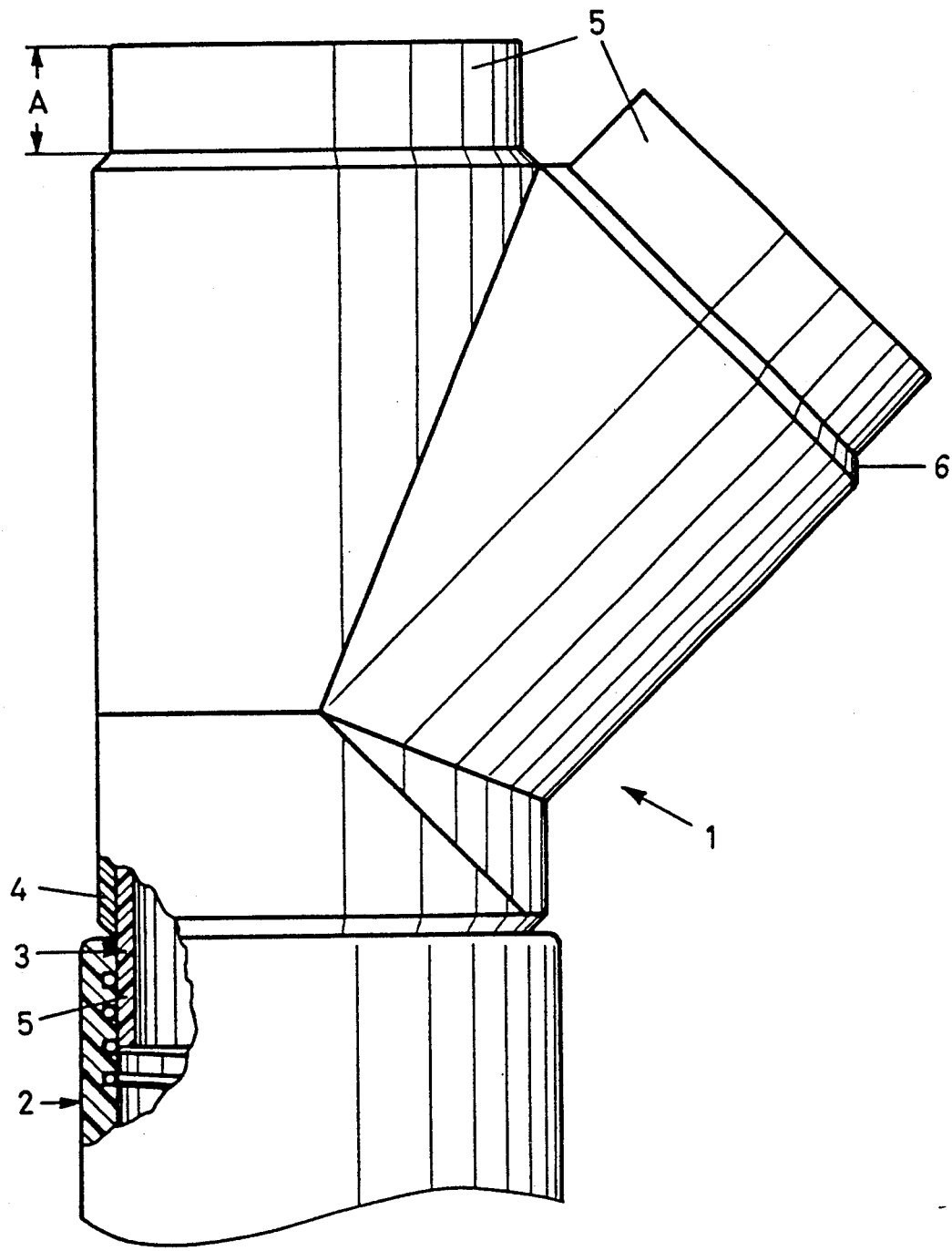

PLASTIC MOLDING FOR PIPE SYSTEMS

FIELD OF THE INVENTION

The invention relates to a molding for pipe systems.

BACKGROUND OF THE INVENTION

To improve the sound-muffling property of a discharge pipe system made with plastic pipe segments, DE-OS [German Specification] 27 14 576 suggests providing the outside of the pipe components with a sound-muffling layer of an open-pore, soft plastic foam, with an inorganic filler. Soft polyurethane foam is suggested for the plastic foam and calcium carbonate or heavy spar for the filler. A system constructed with such pipes has the problem of difficult repairs, particularly since butt welding—frequently used in repairs—is hardly possible. There is always a circular lap all around the outside of the sleeve ends and the thickness of the sound-muffling layer basically corresponds to the external diameter of the lap which surrounds the outside of the sleeve ends. To muffle the sound as much as necessary, 10-mm-thick insulation is required, which means high consumption of material and a correspondingly great use of fuel as well as large space requirements.

Also known as state of the art are mats which are wound around pipes and molded parts and which consist of an inner foam layer, lead foil, and an external PVC foil. Such a mat serves to muffle structure- and airborne sound. However, it is also comparatively thick and requires a great effort during installation and repair.

SUMMARY OF THE INVENTION

The invention addresses the problem of creating moldings for a discharge pipe system wherein said moldings
- can be joined with welding sleeves,
- allow easier repairs and, in particular, butt welding,
- require less material for their manufacture and wherein the material is environment tolerant,
- while easily produced, nevertheless do justice to customary requirements for muffling airborne and structure-borne sound.

The molding can also be severed in the area of the sound-muffling layer and be joined by means of butt welding. With a merely 5-mm-thick insulation layer, sound-muffling is achieved which corresponds to that of multi-layered mats. Specially designed sleeve ends with sealing rings and a lap, which conforms to the thickness of the insulation layer, are not needed. The moldings can instead be joined to straight pipe segments in a simple way by means of welding sleeves. For the moldings of the invention, in contrast to those made with a layer of plastic foam, there is no danger that the insulation layer will splinter. The inorganic filler can be heavy spar (barite). Fuel or lead are not needed for manufacture.

BRIEF DESCRIPTION OF THE DRAWING

An example of an application of the invention is explained in greater detail below on the basis of a single drawing which is a side view, partially in section, of a branch piece with attached welding sleeve.

DESCRIPTION OF PREFERRED EMBODIMENT

The molding shown is a 45° branch piece 1, to which a welding sleeve 2, drawn here schematically, is attached. The entire molding is produced by injection molding and can also be a bow-shaped connection or another molding suitable for pipe systems and particularly discharge pipe systems.

Branch piece 1 has a body 3 of thermoplastic, such as polyethylene, polypropylene, polyvinyl chloride or polybutadiene. Onto this body 3 a sound-muffling layer 4 is sprayed, which consists of a thermoplastic elastomer with an inorganic filler and which has a thickness of 5 mm. The filler is preferably 80 percent by weight heavy spar. Depending on requirements, agents can be added to the elastomer to increase heat and ultraviolet and ozone resistance. The elastomer may be, for instance, a thermoplastic styrene-butadiene, similar to what is being used in the shoe industry.

Body 3 protrudes on both ends by length A from layer 4. To join another pipe segment (not shown), a welding sleeve 2 is always pushed onto the corresponding area 5 of body 3 and welded in the customary manner. Length A corresponds to half the length of a welding sleeve 2. A bevel 6 at the edges of layer 4 serves to fit the molding into the clamping jaw of the welding machine.

In areas 5 said welding sleeve 2 always performs the sound-muffling function. The thickness of welding sleeve 2 is generally about 10 mm, i.e., about twice the thickness of layer 4.

Branch piece 1 can be severed at any point for repairs. At each cleavage plane a repair piece can be added by means of butt welding. In this process, body 3 and also layer 4, which consists of a thermoplastic elastomer, can be welded at the abutting surfaces. Such work is particularly simple and fast since no insulation layers, or the like need be removed and since no insulation measures are necessary after welding. Straight pipe segments can, of course, have the same or a similar insulation layer.

From the above information a molding results which, despite the cited advantages, not only meets technical installation and repair requirements in excellent fashion but—because of its simple and rugged construction—is also economical and operationally reliable.

What is claimed is:

1. Plastic molding, particularly for pipe systems, with a thermoplastic body (3) having attached to an exterior thereof a sound-muffling layer (4) of a thermoplastic elastomer with an inorganic filler.

2. Plastic molding in accordance with claim 1, wherein ends (5) of said body (3) protrude from said sound-muffling layer (4).

3. Plastic molding in accordance with claim 1, wherein said sound-muffling layer (4) is sprayed onto said body (3) by injection/molding process.

4. Plastic molding in accordance with claim wherein said sound-muffling layer (4) has a thickness of about 5 mm.

5. Plastic molding in accordance with claim 2, wherein said sound-muffling layer (4) has bevels (6) at its edges.

* * * * *